Aug. 25, 1970    J. O. WOOD ET AL    3,525,655
METHOD OF MAKING A TIRE USING A FABRIC WITH
CONTRACTED FILAMENTS OR CORDS
Filed April 29, 1964    3 Sheets-Sheet 1
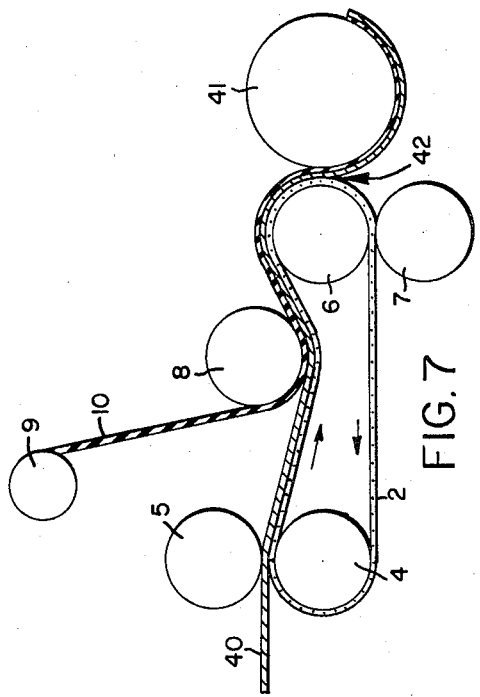
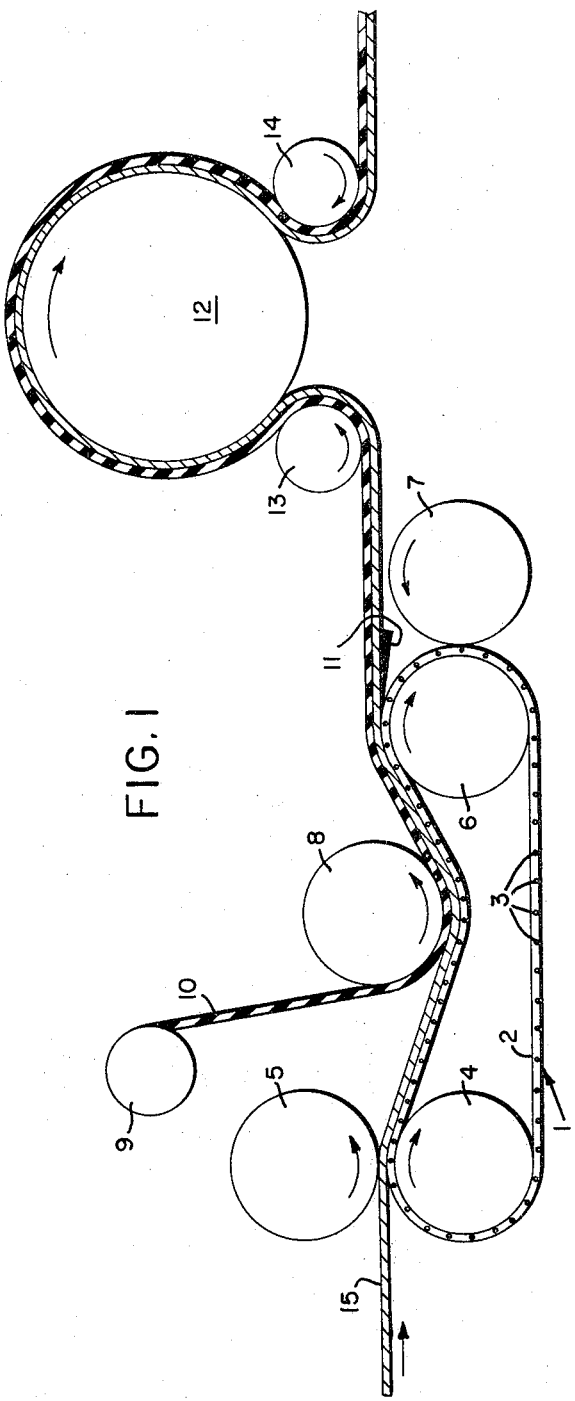
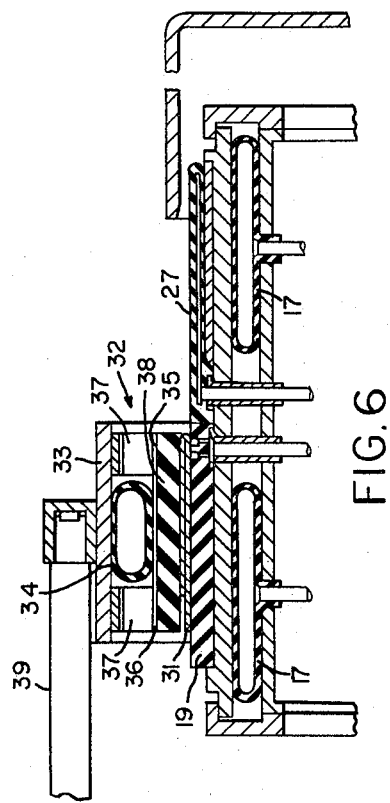

United States Patent Office 3,525,655
Patented Aug. 25, 1970

3,525,655
METHOD OF MAKING A TIRE USING A FABRIC WITH CONTRACTED FILAMENTS OR CORDS
John Oswald Wood, Two Gates, Tamworth; Glyn Beresford Redmond, Erdington, Birmingham; and John Raymond Hemsley, Dordon, near Tamworth, England (all c/o Fort Dunlop, Erdington, Birmingham 24, England)
Filed Apr. 29, 1964, Ser. No. 364,887
Claims priority, application Great Britain, May 6, 1963, 17,753/63
Int. Cl. B29h 17/28
U.S. Cl. 156—126  9 Claims

ABSTRACT OF THE DISCLOSURE

A method for producing rubber tires, using rubberized textile filamentary fabrics in which the textile filaments are longitudinally compressed and unvulcanized rubber is then applied into adhering contact with the filament.

This invention relates to rubberized textile filamentary fabric and methods of manufacturing said fabric.

---

This invention concerns a method of longitudinally compressing textile or other rubber reinforcing material in the form of a thread or parallel threads and then coating it with unvulvanized rubber either before or after compression. The method is particularly useful in the manufacture of reinforced products for tires.

A method of manfactuing pneumatic tires having at least one textile breaker layer which is substantially inextensible around the circumference of the tire has been proposed in which the carcass of the tire is built in substantially cylindrical form and is subsequently expanded into toroidal shape. As this expansion nears completion, the crown portion of the carcass comes into adhering contact with the internal surface of a preformed textile breaker layer or layers disposed at substantially the diameter at which the tire is subsequently molded. The tire is then completed by the addition of an unvulcanized rubber tread and rubber sidewall strips while in the toroidal condition. It has been found necessary to manufacture a pneumatic tire by this method in a case where the textile cords in the breaker layer of the finished tire extend at low angles, i.e. at less than 30°, to a circumferential line crossing the cords, as it has been found impossible to obtain these low angles when a breaker layer has been wrapped around and in adhering engagement with a tire carcass in a substantially cylindrical condition and has been expanded with the carcass into a toroidal shape of the carcass.

It is an object of the invention to provide a method of manufacturing rubberized textile fabric which may be used in the manufacture of a pneumatic tire to overcome the above problem.

According to the invention, a method of manfacturing unvulcanized rubberized textile filamentary fabric comprises longitudinally compressing textile filaments located in side-by-side in substantially parallel relationship to another and applying unvulcanized rubber sheet into adhering contact with the filament or filaments either before or after compression of the filament or filaments. The "applying" referred to may be accomplished by conventional methods, as for example, placing plactized sheet rubber into adhering contact with the filament or filaments either before or after compressing the filament or filaments.

The term "textile filamentary fabric" as used in this specification includes a fabric having for example, nylon, cotton, rayon, polyester or glass filaments or fine metal filaments having similar longitudinal compression and decompression properties to those possessed by nylon, cotton, rayon, polyester or glass filaments.

In a case where the fabric includes a monofilament or monofilaments the monofilament is crimped by a longitudinally compressive force to longitudinally compress or contract it. In a case where the fabric includes filaments in the form of a cord or cords, the cord may be longitudinally compressed to cause some of the strands constituting each cord to move outwardly from one another, and where each strand is one or more monofilament, some or all of the monofilaments may move outwardly from one another. However, the cord may be constrained to follow a wavelike pattern to longitudinally compress the cord in addition to, or instead of, the relative outward movement of the strands.

The rubber may be applied to the filament or filaments after the filament has been longitudinally compressed.

Preferably, the unvulcanized rubber is applied to the filament or filaments in two layers, one on each side of the filament or filaments, and one or both of the layers may be applied before or after longitudinal compression of the filament or filaments.

Preferably also, the filament or filaments after application of unvulcanized rubber thereto, are compressed by supporting the filament or filaments upon a length of longitudinally resiliently extensible rubber which is in a longitudinally stretched condition, and allowing said length longitudinally to contract to compress the filament or filaments.

Alternatively, unvulcanized rubber is applied to a length of vulcanized rubber, in an unstretched condition, the vulcanized and unvulcanized rubber is stretched, the filament or filaments are applied to a surface of the unvulcanized rubber, and the length of vulcanized rubber and the unvulcanized rubber are allowed to contract longitudinally to compress the filament or filaments.

It is also preferable that, during longitudinal compression or contraction of the filament or filaments, lateral extension of the fabric is substantially prevented as hereinafter described.

In addition, it is preferable that after compression of the cord or cords, substantially inextensible means is applied to a surface of the fabric to prevent loss of cord compression. The inextensible means preferably comprises a rubberized uncompressed textile thread or threads each of lower ultimate tensile strength than that of a filament of the fabric and which are applied to the fabric to prevent the fabric from increasing in length until a tensile load is applied in the longitudinal direction of the compressed filament or filaments, to fracture the low strength thread or threads and thus allow increase in the length of and decrease the degree of compression of the compressed filament or filaments. The inextensible means may, however, comprise a sheet of polyethylene which is applied to a surface of the unvulcanized rubber of the fabric in a case where the vulcanized rubber is applied to the filament or filaments after longitudinal compression thereof. However, in a case where the unvulcanized rubber is applied to the filament or filaments and is also compressed therewith, the polyethylene sheet will not adhere directly to the unvulcanized rubber. To avoid this difficulty the polyethylene sheet is formed into a composite layer comprising an unvulcanized rubber layer superposed upon a polyethylene sheet, the unvulcanized rubber layer of which is applied to adhere to the compressed unvulcanized rubber of the fabric.

According to the invention also, unvulcanized rubber coated textile filamentary fabric comprises a longitudinally compressed filament or filaments which are located side-by-side in substantially parallel relationship to one another.

The invention also includes unvulcanized rubber coated textile filamentary fabric made by the method defined above.

If the rubberized textile fabric comprises more than one textile filament in the form of a warp, the fabric may also comprise a plurality of weft filaments which are spaced-apart in the uncompressed state of the filaments to a greater extent than the warp filaments and extend perpendicularly across the textile filaments. The weft filaments may be woven with the textile filaments.

The filamentary fabric may also comprise a frangible rubberized uncompressed textile thread or threads which extend longitudinally of the compressed filamentary fabric to prevent the fabric from increasing in length until a tensile load is applied in the longitudinal direction of the compressed filament or filaments to fracture the thread or threads and allow extension of the compressed filament or filaments.

The invention further includes a method of manufacturing a pneumatic tire comprising manufacturing unvulcanized rubber coated textile filamentary fabric having a plurality of textile filaments by the method defined above, applying at least one strip of the fabric to a tire carcass to form a breaker before shaping of the carcass into substantially the toroidal shape of the finished tire, and then forming the carcass into said shape to increase the length of the compressed strip of fabric and substantially decompress the said filaments.

The invention also includes a pneumatic tire made according to the method defined in the last preceding paragraph or in the manufacture of which rubberized textile filamentary fabric, as defined above, has been used.

Embodiments of the invention will now be described by way of example, with reference to the accompanying drawings in which:

FIG. 1 illustrates, as a first embodiment, one method of longitudinally compressing rubberized textile filamentary fabric upon a compression shrinkage machine;

FIGS. 2 to 6 show stages in a method of making a pneumatic tire by the use of compressed rubberized textile filamentary fabric according to a second embodiment;

FIG. 7 shows diagrammatically a modification of the method shown in FIGS. 2 to 6;

Figure 2:
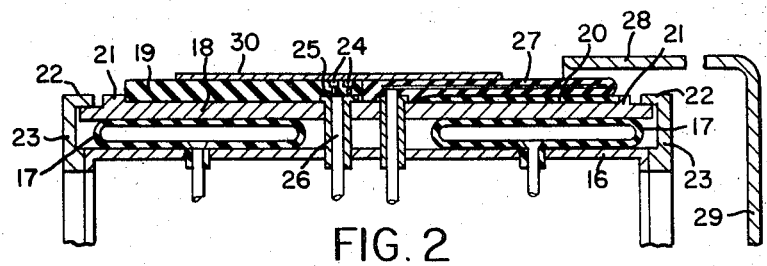

As shown in FIG. 1, a compression shrinkage machine 1 comprises an endless conveyor belt 2 which is formed from an endless length of resilient vulcanized rubber compound, the belt being longitudinally resilient. To prevent any substantial lateral compression and extension of the belt, a plurality of parallel steel cords 3 are embedded within the rubber of the belt and extend from side-to-side of the belt substantially at an angle of 90° to the longitudinal axis thereof, the cords being spaced-apart in a single layer.

As described in the provisional specification of our above mentioned co-pending application, the belt extends around the lower roll 4 of a pair of nip rolls 4 and 5, the axes of which are horizontal and spaced-apart vertically, and through the nip between the rolls, the belt then extending around a roll 6 of a pair of horizontally-spaced nip rolls 6 and 7 each having horizontally disposed axes, the rolls 6 and 7 being spaced from the rolls 4 and 5.

All of the rolls 4, 5, 6 and 7 are provided with means, not shown, to drive the rolls, said means operating to drive the rolls of each pair at substantially equal peripheral speeds and the rolls 4 and 5 at a peripheral speed which is faster than that of the rolls 6 and 7.

The roll driving means also drives a rotatable pressure roll 8, which is disposed between the pairs of nip rolls, at a peripheral speed substantially equal to that of the rolls 6 and 7 but in the opposite direction to the roll 6, as hsown by the arrows upon the rolls, to the roll 6. The upper flight of the conveyor belt, as it extends between the pairs of nip rolls passes beneath and is deflected downwardly by the pressure roll 8, to cause the belt to lap more than one half of the peripheral surface of the roll 6.

A freely-rotatable spool 9, is disposed, with its rotational axis in a horizontal position, above the upper flight of the conveyor belt.

The spool is wound with a continuous length 10 of unvulcanized rubber within which is embedded a plurality of longitudinally extending uncompressed textile threads, each of the threads having a lower ultimate tensile strength than that of a cord of the fabric which is to be compressed, so that the threads are easily fractured to allow for decompression of compressed cords of the fabric as will be described.

A feed-off blade 11, for rubberized textile cord fabric, extends across the conveyor belt and lies in a position adjacent the supporting surface of the belt on the inlet side of the nip of the rolls 6 and 7.

A heating drum 12 for heating compressed rubberized fabric is mounted on the side of the roll 7 remote from the nip between the rolls 6 and 7. The driving means for the rolls is also drivably connected to the heating drum to drive the drum at a peripheral speed substantially equal to that of the drums 6 and 7.

Two freely rotatable horizontally-disposed rolls 13 and 14 are mounted, in spaced-relationship, adjacent the lower part of the heating drum to ensure that compressed fabric fed around roll 13, around the heating drum, and around roll 14 will lie in engagement with substantially three quarters of the peripheral surface of the heating drum.

In use of the machine, the two pairs of nip rolls are rotated to drive the conveyor belt continuously through the gaps provided between the rolls. As the circumferential driven speed of the vertically-spaced rolls 4 and 5 is faster than that of the horizontally spaced rolls 6 and 7 then, as described in the provisional specification of our aforementioned copending application, the lower flight of the belt is stretched in the longitudinal direction by the pull of the belt imposed by the rolls 4 and 5, and the upper flight of the belt is allowed to contract longitudinally but is still retained in a tensioned condition. The belt contracts in the upper flight to 64 percent of the stretched length in the lower flight. Further, as described in said provisional specification, the belt is subject to substantially no lateral narrowing or extension during its extension or contraction because of the provision of the steel cords 3.

A relaxed continuous length of rubberized textile filamentary fabric 15, the textile filaments of which are in the form of a plurality of longitudinally extending side-by-side parallel rayon cords, is fed through the nip between the rolls 4 and 5 and onto the upper flight of the conveyor. The fabric is located in an accurately predetermined lateral position by a fabric guiding device of known form (not shown) located adjacent the inlet side of the nip between the rolls 4 and 5 and the fabric engages the stretched conveyor belt immediately prior to its passage through the nip. When the belt has passed through the nip carrying with it the length of fabric the belt is allowed to contract longitudinally and, due to the adherence of the supporting surface of the belt with the length of fabric, because of the tacky nature of the unvulcanized rubber of the fabric, contraction of the belt effects a substantially equal longitudinal contraction of the unvulcanized rubber and longitudinal compression of the longitudinally extending cords of the fabric. The unvulcanized rubber and the cords, therefore, contract to a length which is 64 percent of the original relaxed length. During the compression of the fabric, lateral extension of the fabric is substantially prevented by the lateral dimensional stability of the conveyor belt caused by the steel cords 3.

The length 15 of compressed fabric is then fed forward along the upper flight of the conveyor belt, and passed beneath the pressure roll 8 together with the continuous length of unvulcanized rubber 10 with embedded threads fed from the spool 9, the unvulcanized rubber adhering to the unvulcanized upper rubber surface of the length 15 of fabric.

The compressed length of fabric superposed by the unvulcanized rubber 10 is then fed around the roll 6, and is removed from the conveyor belt by the blade 11 immediately before passage of the belt through the nip between the rolls 6 and 7.

After removal of the length of fabric from the conveyor, it is held in its longitudinally compressed condition by the uncompressed threads in the unvulcanized rubber 10 until a tensile load is applied to the fabric. However, the uncompressed threads are substantially weaker in tension than the compressed cords of the fabric, so that when a tensile load is applied in the longitudinal direction of the threads to increase the length of the compressed fabric, the uncompressed threads will break to allow for this extension.

The compressed length of fabric and unvulcanized rubber 10 is then fed around the roll 13, heating drum 12 and roll 14 in the manner shown in FIG. 1, and the compressed unvulcanized rubber of the fabric is heated by the drum sufficiently to relax the rubber to reduce or eliminate any stresses present in the rubber.

The longitudinally compressed rubberized rayon cord fabric is then led away from the heating drum to be stored on spools until required. If necessary, a polyethylene sheet is applied to one side of the fabric so that when it is wound onto a storage spool, the windings of unvulcanized rubber fabric are separated by the polyethylene sheet to prevent sticking of adjacent windings, the sheet being removed before the fabric is used.

In a modification of the first embodiment, the unvulcanized rubber length 10 with embedded threads is replaced by an unvulcanized rubber/polyethylene laminate which is in a longitudinally relaxed condition. In use, the laminate is fed from the spool 9 and beneath the pressure roll 8, the unvulcanized rubber of the laminate adhering to the unvulcanized upper rubber surface of the compressed length 15 of the fabric. After removal of the length of fabric from the conveyor, it is held in its longitudinally compressed condition during storage by the adhering contact of the rubber surface of the laminate with the upper surface of the fabric.

In a second embodiment, a continuous length of bias cut rayon cord fabric, to be used to form breaker layers for pneumatic tires, is compressed in a similar manner to that described above, each of the bias cut cords being longitudinally compressed during the compression operation. The longitudinally compressed fabric is then stored in spools, uncompressed longitudinally extending textile threads in the fabric holding the fabric in a compressed state as is described in the preceding embodiment.

In this case, before compression, the bias cut cords extend at an angle of substantially 17° to the length of the fabric. It is desired to compress the cords so that they assume a length, after compression, which is 64 percent of their length before compression. To effect this compression, it is necessary to compress the fabric to a length which is 53 percent of its uncompressed length so that, in this embodiment, the belt contracts in its upper flight, to 53 percent of the stretched length of the lower flight. After compression, the bias cut cords extend at an angle of 27° to the longitudinal direction of the fabric.

The pneumatic tire, for which the compressed bias cut fabric is to be used for breaker material, incorporates four breaker layers, the radially inner two layers of which are formed by one length of bias cut fabric which is folded circumferentially of the tire at one side of the breaker. Similarly, the radially outer layers are formed from one length of fabric which is folded at the other side of the breaker.

To fold the compressed bias cut fabric material in the desired manner, a breaker folding apparatus as shown in FIGS. 2 to 5 is used. This apparatus comprises a rigid cylindrical drum 16 which is secured coaxially to a central rotatable shaft (not shown). Two annular inflatable bags 17 are mounted one to each side of the median plane of the drum 16, the bags being surrounded by a plurality of circumferentially-spaced arcuate segments 18. Inflation of the bags 17 expands the segments 18 to a radially outermost position in which they abut against axially extending abutment shoulders 22 formed intergrally upon end rings 23 secured one on each end of the drum 16. The segments 18 are held in engagement with the bags 17 by means of two resiliently extensible rubber rings 19 and 20 which lie axially side-by-side around the outer peripheral surface of the segments 18, the rings being retained in position by arcuate shoulders 21 provided at each end of each segment 18. The ring 19 is formed at its axially innermost end, with two peripheral grooves 24 which are connected, by passages 25, and a flexible pipe 26, with air pressure reducing means (not shown).

Surrounding the ring 20 is an inflatable rubber bag 27 which in its uninflated condition, as shown in FIG. 2, forms with the ring 19 a substantially cylindrical supporting surface for a length of longitudinally compressed bias cut textile cord fabric, the supporting surface having a diameter when the bags 17 are inflated, substantially equal to that of the outside diameter of the plies of a substantially cylindrically built carcass around which a breaker, when folded, is to be applied.

A rigid sleeve 28, having an inside diameter greater than that of the uninflated diameter of the bag 27, is coaxially and slidably mounted upon the central shaft by means of an integrally formed radially inwardly extending portion 29 (shown in FIGS. 2 to 5).

With the bags 17 and 27 uninflated, an end of the compressed bias cut fabric length 15 is wrapped around the ring 19 and the bag 27 to form an annulus, the wrapped end being located in a predetermined axial position upon the apparatus. The wrapped end is severed from the length 15 to form a bias cut fabric strip 30, the cords of which extend at an angle of 27° to a circumferential line extending around the strip. After the ends of the strip 30 have been joined together, the bags 17 are inflated to expand the segments radially outwardly into engagement with the shoulders 22 (FIG. 2) to consolidate the fabric strip upon the outer peripheral surfaces of the ring 19 and bag 27.

The air pressure reducing means is then operated to reduce the air pressure within the grooves 24 and so retain the part of the fabric strip 30 surrounding the grooves in position during the turning operation which is to follow.

Figure 3:
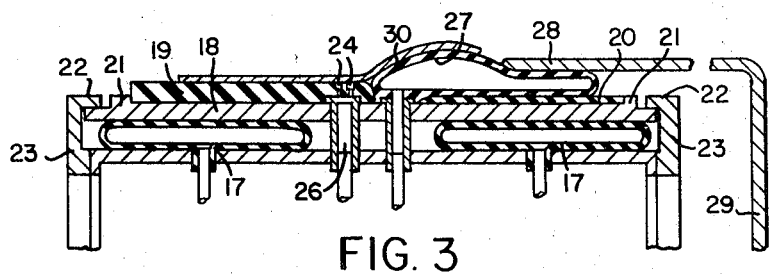
Figure 4:
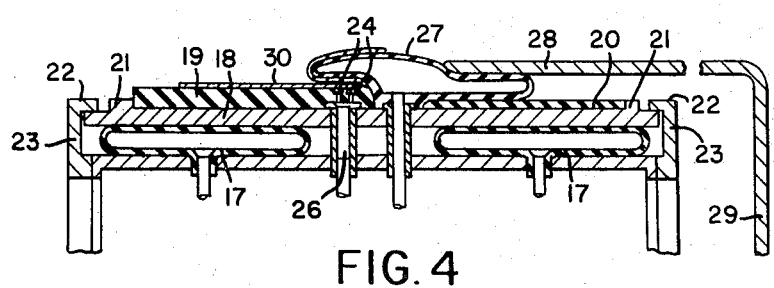
Figure 5:
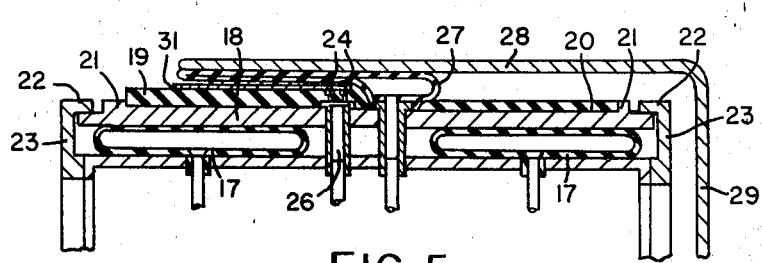

As shown in FIG. 3, with the sleeve 28 partly surrounding the bag 27 but not the length 30 of fabric, the bag is inflated to expand radially outwardly the portion of the fabric strip 30 covering the bag, inflation of the bag ceasing when the part of the bag lying within the sleeve 28 lies in intimate engagement with the sleeve. The sleeve is then moved axially across the bag 27 and ring 19, as shown in FIGS. 4 and 5, to roll the bag axially across the ring 19 and fold the portion of the fabric strip 30 originally surrounding the bag, around that portion of the fabric strip surrounding the ring 19. After the folding operation, the fabric strip 30 is formed into a circumferentially folded two layer breaker 31 as shown in FIG. 5, the edge of the fold extending circumferentially of the breaker, i.e. longitudinally of the fabric strip, in a position radially outwardly of the grooves 24.

The sleeve 28 is then returned to its position shown in FIG. 2, allowing the bag 27 to return to its original position surrounding the ring 20, and the pressure within the grooves 24 is returned to ambient atmospheric pressure.

The breaker 31 is then removed from the breaker folding apparatus by means of a carrying means 32 shown in FIG. 6. The carrying means 32 compresses a rigid cylindrical annulus 33 disposed around the inner peripheral surface of which is an inflatable cylindrical diaphragm 34. A plurality of spring fingers 35 are located in circumferentially spaced relationship within the annulus 33, the fingers each comprising an arcuately-shaped gripping portion 36 disposed on the inner peripheral surface of the diaphragm 34, and two parallel arm portions 37, which are formed integrally with the gripping portion, extend in a radially outwardly and circumferential direction, and are secured at their radially outer ends to the annulus 33. The carrying means 32 differs, however, from the carrying means described in the aforementioned specification, in that it is also provided with a resilient vulcanized rubber ring 38 which lies within and in engagement with the gripping portions 36 of the spring fingers.

The carrying means is coaxially mounted relative to the breaker folding apparatus upon the ends of three arms 39 (one only of which is shown) which are mounted upon a common disc (not shown) which is axially slidable upon a shaft, in the manner described in the complete specification of our aforementioned application, to move the carrying means axially relative to the breaker folding apparatus.

To remove the folding breaker 31 from the breaker folding apparatus, the carrying means is located coaxially and symmetrically around the breaker folding apparatus in an uninflated state of the bag 34. The bag 34 is then inflated to press the gripping portions 36 of the spring fingers radially inwardly and to compress the ring 38 radially inwardly into adhering engagement with the outer peripheral surface of the folded breaker 31 as shown in FIG. 6.

The bags 17 are then deflated and the segments 21 are urged radially inwardly by the resilient rings 19 and 20. The degree of tackiness between the folded breaker and the ring 38 is greater than that between the breaker and the ring 19, so that during its radially inward movement, the ring 19 becomes detached from the folded breaker which remains adhered to the ring 38.

The bag 34 is then deflated allowing the gripping portions 36 of the spring fingers to move radially outwardly. This results in radially outward expansion of the ring 38 and, due to the adherence of the breaker to the ring 38, the breaker is expanded radially outwardly together with the ring, the textile threads in the breaker breaking to allow for this expansion.

The carrying means is then located in a predetermined axial position, coaxially around a tire building former (not shown) upon which carcass plies have already been assembled into a substantially cylindrical condition. The bag 34 is reinflated to compress the breaker 31 radially inwardly int oadhering engagement with the outer peripheral surface of the plies. The bag 34 is then deflated to allow ther ing 38 to expand radially outwardly. During expansion of the ring 38, the breaker 31 remains in engagement with the carcass plies because the adherence of the breaker to the plies is greater than its adherence to the ring 38.

After removal of the carrying means from around the former, a second folded breaker is superposed upon the breaker 31 to form four breaker layers, a length of thread rubber and a pair of sidewall rubbers are applied to the carcass, and the substantially cylindrical carcass thus formed is shaped into a toroidal condition and is molded and vulcanized.

During shaping of the tire, the longitudinally compressed cords of the breaker layer are stretched and when the tire reaches substantially the shape of the finished tire, there is no compression in the cords which are in a substantially stable condition. During shaping, the cord angle in the breaker layers is reduced from 27° to substantially 17° to the mid-circumferential plane of the tire. It will be appreciated that a pair of folded breakers can be applied, in one operation, to a tire carcass instead of each folded breaker, separately.

In a modification of the second embodiment shown in FIG. 7, in which compressed fabrics is not required to be spooled for storage, a strip 40 of bias cut rayon cord fabric, in an uncompressed condition, is folded longitudinally to form it into two layers, and is fed directly off the conveyor belt, after longitudinal compression of the cords, onto a tire building former 41 to form a folded breaker for a pneumatic tire. In this arrangement, the feed off blade 11, the rolls 13 and 14 and heating drum 12 (see FIG. 1) are dispensed with, and the roll 7 is positioned vertically beneath the roll 6 and in engagement with the conveyor belt. The machine 1 is located with the longitudinal axis of the belt symmetrical with respect to the mid-circumferential plane of the tire building former 41 upon which carcass plies have already been assembled into a substantially cylindrical position, the former being disposed horizontally of the roll 6 with the outer peripheral surface of the carcass plies in engagement with the conveyor belt.

The strip 40 is fed through the machine as described in the first embodiment, with reference to FIG. 1, to longitudinally compress the cords, and as the compressed fabric strip is carried by the conveyor between the roll 6 and the tire building former, it adheres to the surface of the carcass plies. A feed-off blade 42 (FIG. 7) is disposed on the outlet side of the nip between the roll 6 and the former 41 to separate the compressed fabric strip 40 from the conveyor belt 2, the strip 40 being fed around the former in engagement with the plies. Because of the adhering contact of the compressed fabric strip with the plies, the fabric strip is prevented from becoming decompressed, i.e. extending longitudinally.

When the fabric strip has been completely fed around the former, the ends of the strip lie in abutting relationship. A second folded fabric strip is then compressed in a similar manner on the conveyor belt, and is fed around the fabric strip 40 on the former, the fold of the second strip being so disposed so as to be located on the opposite side of the assembled breaker to that of the fold in the strip 40.

The former is then removed from the apparatus and, after tread and a pair of sidewall rubbers have been added to the carcass, the substantially cylindrical raw tire is shaped as described in the second embodiment, the bias-cut cords in the breaker being in a substantially stable and uncompressed condition in the toroidally shaped condition of the tire.

Figure 8:
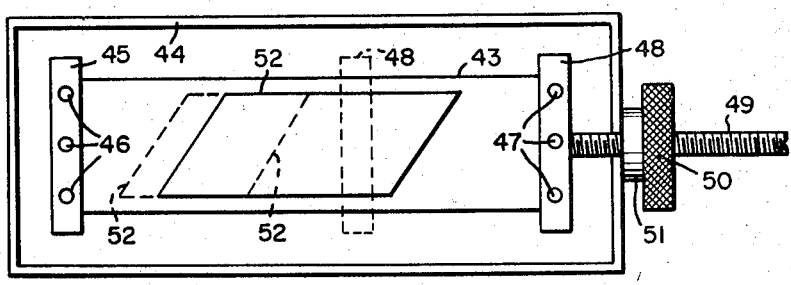
FIG. 8 shows a method of compressing rubberized textile filamentary fabric according to a third embodiment.

In the third embodiment of the invention, as shown in FIG. 8, a compression shrinkage device for rubberized fabric comprises a length 43 of vulcanized rubber. The length of rubber is provided with a plurality of parallel steel cords (not shown) which are embedded within the rubber and extend from side-to-side of the length of the rubber substantially at an angle of 90° to the longitudinal direction of said length to prevent any substantial lateral compression or extension of the length of rubber. One end of the length of rubber is secured between a base plate 44 and a transversely extending metal strip 45 by means of three rivets 46. The other end of the length of rubber is secured by rivets 47 between two transverse metal strips 48. The metal strips 48 are secured to one end of a screw-threaded bar 49 which extends longitudinally of the length of rubber in a direction away from said length, the bar being received in screw-threaded engagement with a knurled nut 50 which abuts against a surface of a stop bracket 51 secured to one end of the base plate.

In use, the length of rubber is initially stretched from a stable unstretched condition, in which the metal strips 48 are in the position shown in dotted outline in FIG. 8, to a stretched condition, in which the strips 48 are disposed in the full outline position. The distance between the ends of the stable length of rubber is 53 percent of that distance in the stretched condition of the length of rubber. The movement of the strips 48 relative to the base plate 44, and thus the stretching of the rubber length 16, is effected by rotating the screw-threaded nut 50 upon the bar 49 to cause the bar to move through the nut in a direction away from the metal strip 45, movement of the nut in the other direction being prevented by its abutting engagement with the bracket 51.

A strip 52 of bias cut rubberized textile cord fabric the cords of which extend at an angle of 17° to the length of the strip and which have been rubberized by the application of two layers of unvulcanized rubber one to each side of the cords, is placed in adhering contact with the stretched rubber length 43, the fabric strip 52 occupying the full outline position shown in FIG. 8.

The stretched rubber length is then allowed to longitudinally contract by rotation of the nut 50 in the appropriate direction relative to the bar 51 to allow the bar to move longitudinally towards the metal strip 45. During this longitudinal contraction, the fabric strip 52, together with its textile cords, is compressed longitudinally because of the adherence of the unvulcanized rubber of the fabric to the contracting rubber length 43. In its compressed condition, the strip has a length which is 53 percent of its uncompressed length and each compressed cord has a length which is 64 percent of its uncompressed length and assumes an angle of 27° to the length of the strip.

In the relaxed state of the rubber length 43, the compressed fabric strip 52 occupies a position shown in dotted outline in FIG. 8.

A length of unvulcanized rubber (not shown) containing uncompressed longitudinally extending textile threads is then pressed into adhering contact with the upper surface of the compressed fabric strip with the unvulcanized rubber of the laminate in engagement with the rubber of the fabric strip. The compressed fabric strip is then removed from the rubber length 43 and is put into storage until required, the textile threads preventing extension of the compressed strip.

To make a pneumatic tire having four breaker layers of similar construction to that described in the second embodiment, a compressed fabric strip 52 is wrapped around a breaker folding apparatus of similar construction to that described in the second embodiment. After joining of the ends of the strip 52, the strip is folded upon the apparatus and is then applied to a tire carcass to form a folder breaker in the manner described in the second embodiment. A second compressed strip 52 is then folded and applied to a carcass in a similar manner and the tire is completed as described in the second embodiment, the cords being decompressed during toroidal shaping of the carcass and assuming an angle of 17° to the mid-circumferential plane of the tire in the finally shaped tire.

In a modification (not shown) of the third embodiment, a vulcanized rubber length similar in construction and method of mounting to the length 43 described above, is of sufficient width to support a length of bias cut rayon cord fabric extending transversely of the rubber length.

To compress a strip of bias cut fabric, the rubber length is initially stretched so that the distance between its ends in the stable condition is 35 percent of that distance in the stretched condition. The fabric, in which the cords extend at 55° to its longitudinal axis, is positioned upon the rubber length with its longitudinal axis lying normal to that of the rubber length. The rubber length is then allowed to contract as described in the third embodiment, thereby compressing the fabric strip laterally and compressing the bias-cut cords longitudinally. In the compressed state, the fabric has a compressed width which is 35 percent of the width in its uncompressed condition and each cord has a length which is 64 percent of the uncompressed length and assumes an angle of 27° to the longitudinal axis of the strip. After compression, the fabric strip is located around a breaker folding machine as described above, with the longitudinal axis of the fabric strip extending circumferentially of the folding apparatus. The fabric strip is then folded upon this apparatus, and a tire is completed as described in the third embodiment, the breaker cord angles in the finished tire being substantially 17° to the mid-circumferential plane. Thus lateral pre-compression can be followed by a longitudinal decompression of the cords.

In a fourth embodiment, rubberized rayon cord fabric is longitudinally compressed upon the apparatus shown in FIG. 8 by a different method from that described in the third embodiment. In this method, not shown, a layer of unvulcanized rubber of length equal to the desired length of the finished compressed fabric, is brought into adhering contact with the rubber layer 43 which is in its longitudinally relaxed condition. The layer 43, and thus the unvulcanized rubber layer, is stretched longitudinally until the metal strips 48 lie in the full outline position shown in FIG. 8.

A sheet of rayon cord fabric is then applied to the upper surface of the stretched unvulcanized rubber layer and another unvulcanized rubber layer which is stretched on a second vulcanized rubber layer 43 in a similar manner is brought into adhering contact with the sheet of fabric to sandwich it between the two unvulcanized rubber layers. The rubber layers 43 are then allowed to contract longitudinally, this compression contracting the unvulcanized rubber layers and compressing the textile cords of the fabric.

In the compressed condition of the cords, the unvulcanized rubber layers have lengths substantially equal to their length before extension and are, therefore, in substantially uncompressed and stable conditions. To retain the compressed fabric in a compressed state after removal from between the vulcanized rubber lengths 16, a sheet of unvulcanized rubber containing uncompressed textile threads is brought into adhering contact with one surface of the fabric. Each length of compressed fabric may then be used to form a folded breaker for a tire as described in the third embodiment.

Figure 9:
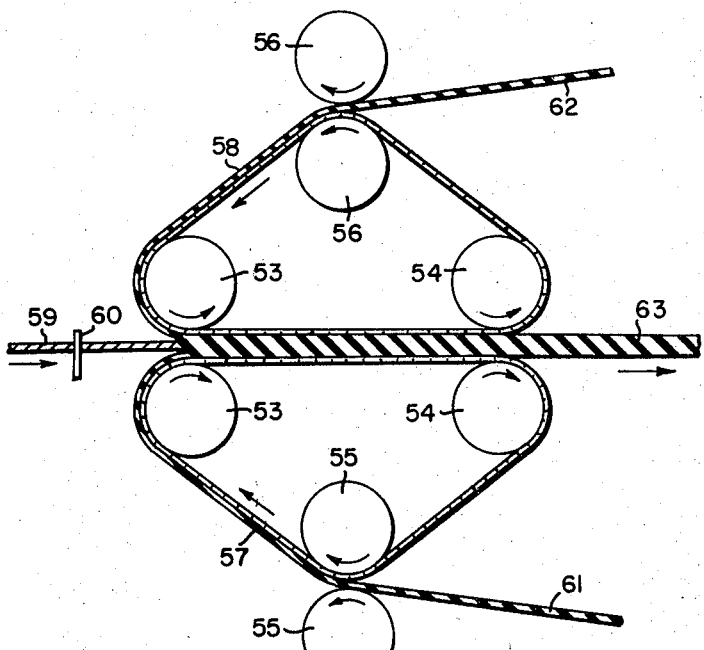
FIG. 9 shows a method of compressing rubberized textile filamentary fabric according to a fifth embodiment; and, FIG. 10 illustrates the method of compressing rubberized textile filamentary fabric employing an axially resiliently extensible rubber sleeve forming the supporting surface of the fabric.

In a fifth embodiment of the invention as shown in FIG. 9, a compression-shrinkage device comprises four pairs of nip rolls, disposed with their axes horizontal and substantially parallel. The four pairs of rolls comprise two horizontally-spaced apart pairs of rolls 53 and 54 and two vertically-spaced apart pairs 55 and 56. Two endless rubber conveyor belts 57 and 58 provided with stabilizing steel cords (not shown), as described for the conveyor belt in the first embodiment, extend through the nips between rolls 53 and 54. The belt 57 also extends through the nip between the rolls 55 while the belt 58 extends through the nip between the rolls 56. Driving means (not shown) are provided for driving all of the rolls, the driving means operating to drive the rolls 54, 55 and 56 at substantially the same peripheral speed but at a peripheral speed less than that of the rolls 53.

In use, the rolls are driven to drive the belts in the directions indicated by the arrows, and as the rolls 53 are driven at a faster peripheral speed than the rolls 55 and 56, the portions of the belts 57 and 58 lying, respectively, between the nips of rolls 55 and 53 and nips of rolls 56 and 53, are longitudinally stretched. Further, these portions of the belts as they pass through the nip between the rolls 53, are allowed to contract longitudinally but are still retained in a tensioned condition.

As shown in FIG. 9, a plurality of continuous textile cords 59 are fed from creels (not shown) through a guiding comb 60 to place the cords in parallel side-by-side relationship. The cords are then passed as a sheet through the nip between rolls 53.

Simultaneously, two continuous layers of unvulcanized rubber 61 and 62, in a longitudinally relaxed condition, are fed, respectively, through the nips between the rolls 55 and 56 to bring the layers into adhering engagement with the conveyor belts 57 and 58. Due to the adhering engagement of the rubber layers with the belts, as the belts are stretched as they leave the nips between the rolls 55 and 56, the rubber layers are also stretched.

The stretched rubber layers are carried forward upon the belts and through the nip between the rolls 53, the layers adhering one to each side of the layer of textile cords to form a sheet 63 of rubberized textile cord fabric.

As the conveyor belts are allowed to contract longitudinally as they leave the nip between the rolls 53, the layers of unvulcanized rubber are longitudinally contracted and the sheet of cords is longitudinally compressed.

The compressed fabric and the conveyor belts then pass through the nip between the rolls 54 and, as the belts extend around these rolls, they peel themselves away from the rubberized sheet of compressed cords.

After the sheet 63 of compressed fabric has passed between the rolls 54 it is fed around a driving roller (not shown) and onto a spool for storage. here is a natural tendency for the fabric to decompress but the driving roll which has a peripheral driven speed which is faster than the forward movement of the fabric serves to stretch the compressed fabric as it feeds it onto the spool but the fabric still retains a predetermined degree of compression, i.e. the unvulcanized rubber and compressed cords when stored on the spool have a length which is 64 percent of their original length. A sheet of polyethylene is also fed round the driving roll into adhering contact with the fabric to retain it in its compressed state during storage of the sheet. The compressed fabric is then wound onto a spool for storage.

When required for use in the manufacture of pneumatic tires, the sheet 63 is unwound from its storage spool and is cut into bias cut compressed strips the cords of which lie at an angle of 26° to the longitudinal axes of the strips. To manufacture a folded breaker construction, each strip is applied to a breaker folding apparatus and is folded and the tire is completed in the manner described in the second embodiment, the final breaker cord angle being 17° to the midcircumferential plane.

In modifications of any of embodiments two to five described above, a strip of bias cut compressed fabric is applied to a substantially cylindrically built tire carcass to form an unfolded breaker layer.

Figure 10:
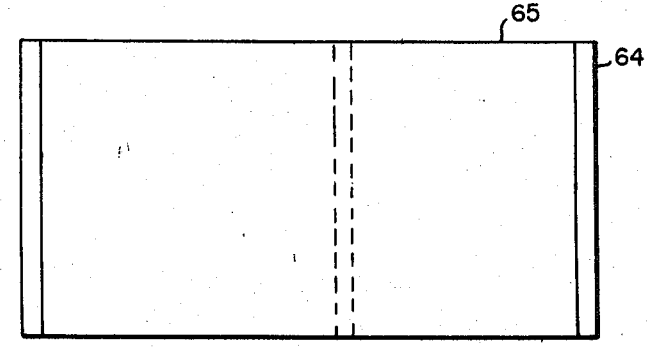

In a sixth embodiment as shown in FIG. 10, a breaker assembly former for a pneumatic tire comprises an axially resiliently extensibe rubber sleeve 64 forming the supporting surface of the former. A plurality of circumferentially-extending steel cords (not shown) are embedded within the sleeve 64 to prevent radial expansion thereof.

In use of the former, the rubber sleeve 64 is stretched axially (the axially stretched rubber sleeve being shown in solid line) so that the unstretched axial length of the sleeve 64 is 35 percent of that length in the stretched condition. A stable strip of bias cut rubberized rayon cord fabric 65 in which the cords lie at 55° to the length of the strip, is wrapped around the former in adhering contact with the sleeve 64, and the ends of the strip are joined together to form the strip into a substantially cylindrical condition. The sleeve 64 is then allowed to contract axially and, because of the adherence of the strip of fabric 65 to the sleeve 64, the strip of fabric 65 is compressed laterally so that the cords are compressed longitudinally. In the compressed state the wrapped strip has a compressed axial width which is 35 percent of its uncompressed width and each cord has a length which is 64 percent of the uncompressed length and assumes an angle of 27° to the longitudinal axis, i.e. the midcircumferential plane, of the strip.

A carrying means similar in construction to the carrying means 32 of the second embodiment is then located around the compressed strip of fabric. As the rubber sleeve is not radially contractible, because of the steel cords, to transfer the strip of fabric to the carrying means it is necesesary to deflate the bag 34 (FIG. 6) of the carrying means to allow the rubber ring 38 to expand radially outwardly which also expands the compressed fabric radially outwardly and out of engagement with the rubber sleeve. The strip of fabric is then transferred to a tire carcass to form a breaker, and the tire is completed as described in the second embodiment. In the finished tire, the breaker cords extend substantially at an angle of 17° to the mid-circumferential plane of the tire.

In a seventh embodiment (not shown), a breaker assembly former for a pneumatic tire is in the form of a radially expansible cylindrical member which has a supporting surface having a diameter which is greater than that of the outside diameter of the plies of a substantially cylindrically built carcass around which a breaker, when folded, is to be applied. The diameter of the supporting surface is also substantially less than that of the breaker in the finished tire.

Carrying means to transfer a breaker from the breaker assembly former to a tire building former comprises a resilient radially extensible rubber ring which is provided with a plurality of axially extending steel cords to prevent axial extension or compression of the ring. The ring is formed from a rubber length, the end of which are brought together and are held together by a steel pin extending through transversely extending aligned holes provided in the ends. Two metal hoops are provided for location one radially within each end of the ring to retain it in a radially expanded condition.

In use, a plurality of compressed folded strips of bias cut fabric, the compressed cords of which lie at 27° to the longitudinal axes of the strips, are wrapped around the breaker assembly former, in a collapsed condition thereof, to form a plurality of superposed breaker layers.

The rubber ring is then located around an inflatable bag which is inflated to stretch the ring radially outwardly. When the rings has been stretched to an inside diameter which is greater than the outside diameter of the assembled breaker layers, the hoops are inserted, one at each end of the ring, to retain it at this diameter.

The bag is deflated, the ring is then positioned coaxially and symmetrically around the assembled breaker layers, and the former is expanded to expand the breaker layers into adhering contact with the inner peripheral surface of the ring. The ring containing the breaker layers, is then located coaxially and symmetrically around a substantially cylindrically built tire carcass upon a former, after which the hoops are removed to allow the ring to contract radially inwardly to bring the breaker layers into adhering engagement with the carcass. The ring is then removed from the breaker layers by removal of the pin from the holes in the ends of the ring and by peeling off the ring from the breaker progressively from one end of the ring to the other.

Although the present invention has been illustrated and described in connection with selected example embodiments, it will be understood that these are illustrative of the invention and are by no means restrictive thereof. It is reasonable to be expected that those skilled in the art can make numerous revisions and adaptations of the invention, and it is intended that such revisions and adaptations will be included within the scope of the following claims as equivalents of the invention.

Having now described our invention, what we claim is:

1. A method of manufacturing a pneumatic tire provided with a breaker assembly comprising the steps of: stretching a length of vulcanized rubber longitudinally, applying to the surface of the stretched length of vulcanized rubber an unvulcanized rubberized strip of fabric comprised of a plurality of textile filaments disposed in side-by-side and substantially parallel relation and with the filaments adhering to the said length of vulcanized rubber by means of the said unvulcanized rubber, allowing the said length of vulcanized rubber to contract longitudinally thereby to contract the said filaments, applying at least one strip of unvulcanized rubberized contracted textile filamentary fabric which has been formed in accordance with the foregoing steps to an unshaped tire carcass, and shaping the carcass into the toroidal shape of a finished tire to increase the length of the contracted strip of fabric and thereby to extend the said filaments.

2. The method according to claim 1 comprising preventing lateral extension of the strip of fabric during longitudinal contraction of said filaments.

3. The method according to claim 1 comprising heating said fabric after contraction of the filaments to reduce the stresses present in the unvulcanized rubber.

4. The method according to claim 1 including folding said fabric longitudinally, after contraction of said filaments and before application of said strip to the tire carcass to form a circumferentially folded breaker after the folded strip is applied to the tire carcass.

5. The method according to claim 1 comprising forming the strip of fabric into a substantially cylindrical condition after contraction of said filaments and before application of the strip to the tire carcass, locating the formed strip coaxially about the unshaped tire carcass, contracting the formed strip radially inwardly with respect to the carcass and into adhering engagement therewith, and then shaping the carcass into the toroidal shape of the finished tire.

6. The method according to claim 1 including the step of folding said strip about its circumferential median into two layers, after forming said strip into a cylindrical condition.

7. A method of manufacturing a pneumatic tire provided with a breaker assembly comprising the steps of: stretching a radially extensible cylinder of vulcanized rubber axially of the cylinder, applying to the said cylinder an unvulcanized rubberized strip of fabric comprised of a plurality of textile filaments disposed in side-by-side and substantially parallel relation, said unvulcanized rubberized strip being in the form of a cylinder coaxially disposed about said cylinder of vulcanized rubber, said filaments extending at a bias angle to a circumferential plane of the cylinder fabric and adhering to the cylinder of vulcanized rubber by means of said unvulcanized rubber, allowing the said cylinder of vulcanized rubber to contract axially and thereby to contract axially the fabric and longitudinally to contract the filaments, locating the unvulcanized rubberized axially contracted cylinder of fabric formed by the foregoing steps coaxially about an unshaped tire carcass, contracting the cylinder of material radially inwardly into an adhering engagement with the tire carcass and shaping the tire carcass into the toroidal shape of a finished tire.

8. The method in accordance with claim 7 comprising folding said strip circumferentially thereof into two layers, one layer superimposed upon the other layer before application of the said strip to the unshaped carcass.

9. The method in accordance with claim 1 wherein said filaments of the fabric are cords.

References Cited

UNITED STATES PATENTS

| | | | |
|---|---|---|---|
| 2,235,690 | 3/1941 | Teague et al. | 156—163 |
| 2,737,701 | 3/1956 | Hubbard et al. | 156—85 |
| 2,884,044 | 4/1959 | Hulswit et al. | 156—110 |
| 2,982,328 | 5/1961 | Emmanueli | 152—361 |
| 3,018,814 | 1/1962 | Saint-Paul | 152—361 |
| 3,236,718 | 2/1966 | Cohn et al. | 156—183 |
| 554,535 | 2/1896 | Plechner | 161—77 |
| 1,657,829 | 1/1928 | Hopson | 156—179 |
| 2,431,977 | 12/1947 | Alderfer | 156—229 |
| 3,101,289 | 8/1963 | Giletta et al. | 156—416 |
| 3,264,155 | 8/1966 | Rhee | 156—160 |

FOREIGN PATENTS 501,882   3/1939   Great Britain.

JOHN T. GOOLKASIAN, Primary Examiner

W. E. HOAG, Assistant Examiner

U.S. Cl. X.R.

152—257, 361; 156—123, 133, 160